US012576295B2

(12) United States Patent
Tripp et al.

(10) Patent No.: US 12,576,295 B2
(45) Date of Patent: Mar. 17, 2026

(54) DELIVERING FLUID THROUGH AN ELECTRIC VEHICLE

(71) Applicant: Howe & Howe Inc., Waterboro, ME (US)

(72) Inventors: Forrest Joel Tripp, East Waterboro, ME (US); Anthony Victor Castro, Cape Elizabeth, ME (US); Michael Howe, Biddeford, ME (US)

(73) Assignee: Howe & Howe Inc., Waterboro, ME (US)

( * ) Notice: Subject to any disclaimer, the term of this patent is extended or adjusted under 35 U.S.C. 154(b) by 275 days.

(21) Appl. No.: 18/464,563

(22) Filed: Sep. 11, 2023

(65) Prior Publication Data

US 2024/0082612 A1    Mar. 14, 2024

Related U.S. Application Data

(60) Provisional application No. 63/405,296, filed on Sep. 9, 2022.

(51) Int. Cl.
| | |
|---|---|
| *A62C 31/28* | (2006.01) |
| *A62C 27/00* | (2006.01) |
| *B60K 1/04* | (2019.01) |
| *B60R 16/08* | (2006.01) |

(52) U.S. Cl.
CPC .............. *A62C 27/00* (2013.01); *A62C 31/28* (2013.01); *B60K 1/04* (2013.01); *B60R 16/08* (2013.01)

(58) Field of Classification Search
CPC .......... A62C 27/00; A62C 31/28; B60K 1/04; B60R 16/08
See application file for complete search history.

(56) References Cited

U.S. PATENT DOCUMENTS

| | | | |
|---|---|---|---|
| 3,762,478 A | 10/1973 | Cummins | |
| 5,390,754 A * | 2/1995 | Masuyama | ............. B60L 58/18 |
| | | | 180/68.5 |
| 5,860,479 A | 1/1999 | LaFollette | |

(Continued)

FOREIGN PATENT DOCUMENTS

| | | | | |
|---|---|---|---|---|
| CN | 108815754 A * | 11/2018 | ............. | A62C 37/40 |
| CN | 112827098 A * | 5/2021 | ............... | A62C 3/02 |

(Continued)

OTHER PUBLICATIONS

International Search Report and Written Opionion for PCT application No. PCT/US2023/032380, filed on Sep. 11, 2023, 10 pages.

*Primary Examiner* — Steven M Sutherland
(74) *Attorney, Agent, or Firm* — BainwoodHuang

(57) ABSTRACT

A firefighting vehicle includes a chassis that houses an electric drivetrain for driving wheels of the vehicle. A conduit extends within the chassis from back to front for conveying firefighting fluid. Within the chassis, a first motor and a first battery pack are disposed on a first side of the conduit and a second motor and a second battery pack are disposed on a second side of the conduit. The first motor is configured to drive a first wheel on a first side of the vehicle, and the second motor is configured to drive a second wheel on a second side of the vehicle. The conduit is configured to provide firefighting fluid to a monitor mounted at the front of the chassis, where the fluid can be discharged toward a target, such as a fire.

20 Claims, 7 Drawing Sheets

(56)               References Cited

U.S. PATENT DOCUMENTS

| | | | |
|---|---|---|---|
| 7,201,213 | B2 | 4/2007 | Leeson et al. |
| 7,856,810 | B2 | 12/2010 | Longdill et al. |
| 7,963,271 | B2 | 6/2011 | Samanta et al. |
| 8,225,895 | B1 | 7/2012 | Salton et al. |
| 9,623,271 | B2 | 4/2017 | Mcloughlin et al. |
| 10,246,174 | B2 | 4/2019 | Stimmel et al. |
| 10,378,425 | B2 | 8/2019 | Quix et al. |
| 11,034,427 | B2 | 6/2021 | Stimmel et al. |
| 11,345,267 | B2 | 5/2022 | Howe et al. |
| 2007/0119157 | A1 | 5/2007 | Longdill et al. |
| 2013/0112440 | A1 | 5/2013 | Alsaif et al. |
| 2017/0112021 | A1 | 4/2017 | Gradinger et al. |
| 2021/0162247 | A1 | 6/2021 | Kovalev et al. |
| 2021/0237537 | A1 | 8/2021 | Hwang et al. |

FOREIGN PATENT DOCUMENTS

| | | | | | |
|---|---|---|---|---|---|
| CN | 113368430 | A | * | 9/2021 | ........... A62C 3/0292 |
| CN | 116474300 | A | * | 7/2023 | ............. A62C 27/00 |
| EP | 2310789 | | | 2/2012 | |
| EP | 3991804 | | | 4/2022 | |
| KR | 101400770 | B1 | * | 5/2014 | ............. A62C 27/00 |

* cited by examiner

DELIVERING FLUID THROUGH AN ELECTRIC VEHICLE

CROSS-REFERENCE TO RELATED APPLICATIONS

This application claims the benefit of prior-filed U.S. Provisional Application No. 63/405,296, filed Sep. 9, 2022, the contents and teachings of which are incorporated herein by reference in their entirety.

BACKGROUND

1. Field

This disclosure relates generally to vehicle designs, and more particularly to a platform for an electrically powered, firefighting vehicle.

2. Description of Related Art

Firefighting vehicles include firetrucks, firefighting robots, and other types of vehicles. Firefighting robots are specially adapted vehicles for spraying water on fires. Smaller than firetrucks, firefighting robots are maneuverable and able to aim water accurately at desired targets. For example, the Thermite robot available from Howe & Howe, Inc. of Waterboro, ME, is a remote controlled, tracked vehicle with a remotely aimed nozzle (monitor) that can discharge 1,500 gallons or more of water per minute. The Thermite has the ability to withstand environments that are too hazardous for human personnel.

SUMMARY

Prior examples of firefighting vehicles are powered by gasoline or diesel fuel. Although these fuels are high in energy density, they are also highly flammable and thus can pose safety risks when operated in excessively hot environments or in spaces where there are open flames. In addition, gasoline and diesel engines tend to provide low torque at low speeds, but sometimes firefighting vehicles can benefit from high torque at low speeds, such as when climbing over obstacles or when dragging water-charged hoses or heavy equipment. Further, adding gasoline or diesel exhaust to an environment that is already filled with toxic smoke does not help to promote the health and well-being of trapped people or animals or of personnel in the vicinity of the vehicle. Further still, performance of combustion engines can degrade markedly in smoke-filled spaces, which may contain many contaminants and may be starved of oxygen.

In contrast with the above-described firefighting vehicles, which are powered by gasoline or diesel fuel, an improved firefighting vehicle includes a chassis that houses an electric drivetrain for driving wheels of the vehicle. A conduit extends within the chassis from back to front for conveying firefighting fluid, such as water, gel, foam, or a combination thereof. Within the chassis, a first motor and a first battery pack are disposed on a first side of the conduit and a second motor and a second battery pack are disposed on a second side of the conduit. The first motor is configured to drive a first wheel on a first side of the vehicle, and the second motor is configured to drive a second wheel on a second side of the vehicle. The conduit is disposed to provide firefighting fluid to a monitor mounted at the front of the chassis, where the fluid can be aimed toward a target, such as a fire.

Advantageously, the improved firefighting vehicle contains far less if any flammable fluids. It avoids toxic emissions that degrade air quality in already-polluted environments and avoids adding combustion heat to already-hot environments. Operation of the improved firefighting vehicle is insensitive to air quality and oxygen levels. In addition, the improved firefighting vehicle provides high torque at low speeds, which is better suited than gasoline or diesel-powered vehicles for plowing, dragging objects, and moving over barriers.

Certain embodiments are directed to a firefighting vehicle. The vehicle includes a chassis having a back and a front, a conduit within the chassis for conveying firefighting fluid from the back to the front, and first and second electric motors within the chassis at first and second sides of the conduit, respectively. The first and second electric motors are respectively configured to drive first and second wheels for propelling the vehicle. The firefighting vehicle further includes first and second battery modules within the chassis at the first and second sides of the conduit, respectively, each of the first and second battery modules coupled to at least one of the first and second electric motors for providing power thereto.

In some examples, the vehicle is a tracked vehicle having first and second tracks, and wherein the first and second wheels include first and second drive sprockets that engage the first and second tracks.

In some examples, the chassis further has a first side and second side, the first electric motor is mounted to the first side of the chassis, and the second electric motor is mounted to the second side of the chassis.

In some examples, the chassis has a floor, and the first and second battery modules are mounted to the floor of the chassis.

In some examples, the floor of the chassis has perforations to allow drainage.

In some examples, the conduit runs centrally along the floor of the chassis between an adapter at the rear of the chassis and a monitor at the front of the firefighting vehicle.

In some examples, the firefighting vehicle further includes a flexible insert disposed between the conduit and the chassis to reduce transmission of vibration between the conduit and the chassis.

In some examples, the firefighting vehicle further includes a cover mounted above the conduit inside the chassis, the cover providing a support for mounting additional equipment within the chassis.

In some examples, the additional equipment mounted to the support includes a low-voltage battery and a cold plate for cooling power converters.

In some examples, the chassis further has a first side and second side, and the firefighting vehicle further includes a component tray mounted above the battery modules and above the conduit inside the chassis, the component tray attached to respective brackets mounted to the first side and the second side of the chassis.

In some examples, the component tray is attached to the respective brackets using hand-operable fasteners.

In some examples, the component tray houses components for which convenient access is desired, said components including any of: fuses; relays; and spare parts.

In some examples, the component tray is user-accessible via a top deck of the firefighting vehicle. The top deck is attached to the firefighting vehicle using hand-operable fasteners and is removeable from the firefighting vehicle for providing access to the component tray by disengaging the hand-operable fasteners without the use of tools.

In some examples, the firefighting vehicle further includes a fluid tap coupled to the conduit, the fluid tap constructed and arranged to draw fluid from the conduit, and a set of sprayers coupled to the fluid tap. The set of sprayers is constructed and arranged to spray at least a portion of the fluid drawn from the conduit onto external surfaces and tracks of the firefighting vehicle.

In some examples, the firefighting vehicle further includes a cooling system coupled in line between the fluid tap and the set of sprayers. The cooling system is constructed and arranged to provide the fluid drawn from the conduit for cooling electrical components within the chassis.

Other embodiments are directed to a chassis for a firefighting vehicle. The chassis includes a conduit for conveying firefighting fluid from a back of the chassis to a front of the chassis, and first and second electric motors disposed at first and second sides of the conduit, respectively. The first and second electric motors are constructed and arranged to drive first and second respective wheels for propelling the vehicle. The chassis further includes first and second battery modules disposed at the first and second sides of the conduit, respectively. Each of the first and second battery modules is coupled to at least one of the first and second electric motors for providing power thereto.

In some examples, the first electric motor is mounted to a first side of the chassis and the second electric motor is mounted to a second side of the chassis.

In some examples, the first and second battery modules are mounted to a floor of the chassis, and the conduit runs centrally along the floor of the chassis between an adapter at the rear of the chassis and the front of the chassis.

In some examples, the chassis further includes a component tray mounted above the battery modules and above the conduit inside the chassis. The component tray is attached to respective brackets mounted to first and second sides of the chassis.

In some examples, the component tray is removeable from the chassis by disengaging one or more hand-operable fasteners.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Figures 1, 2:
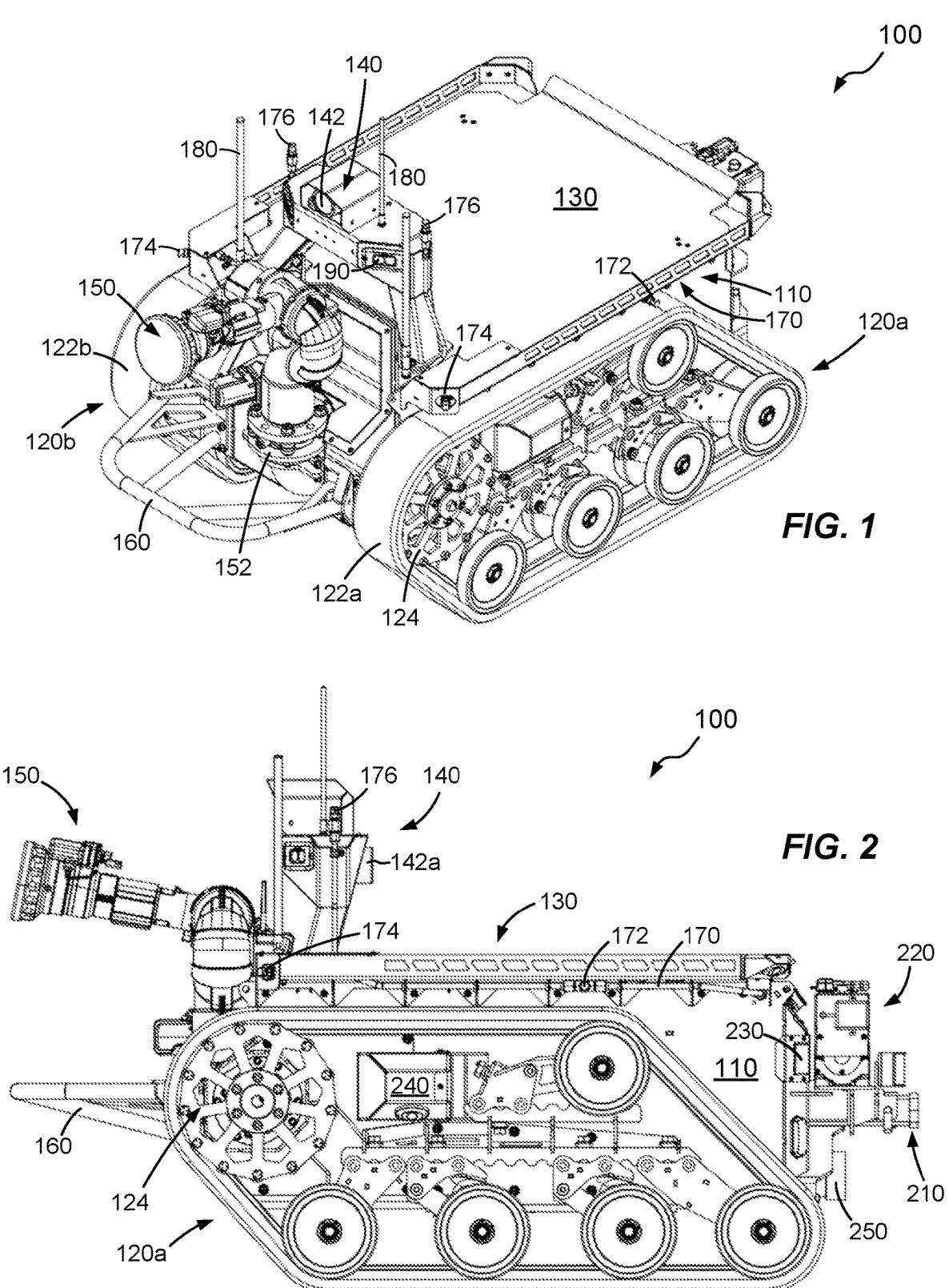
FIG. 1 is a front upper-left isometric view of an example firefighting vehicle in accordance with certain embodiments.
FIG. 2 is an elevated left-side view thereof.

Embodiments of the improved technique will now be described. One should appreciate that such embodiments are provided by way of example to illustrate certain features and principles but are not intended to be limiting.

An improved firefighting vehicle includes a chassis that houses an electric drivetrain for driving wheels of the vehicle. A conduit extends within the chassis from back to front for conveying firefighting fluid. Within the chassis, a first motor and a first battery pack are disposed on a first side of the conduit and a second motor and a second battery pack are disposed on a second side of the conduit. The first motor is configured to drive a first wheel on a first side of the vehicle, and the second motor is configured to drive a second wheel on a second side of the vehicle. The conduit is disposed to provide firefighting fluid to a monitor mounted at the front of the chassis, where the fluid can be aimed toward a target, such as a fire.

In some examples, the chassis has a floor, and the conduit runs between the front and back of the chassis along the floor.

In some examples, the floor includes perforations that enable any fluid within the chassis to be drained.

In some examples, the conduit is mechanically coupled to the chassis using suspension, such as one or more rings and/or cradles that provide cushioning, to reduce conduction of vibration between the set of conduits and the chassis.

In some examples, the first battery module supplies power to the first electric motor but not the second electric motor, and likewise the second battery module supplies power to the second electric motor but not the first electric motor.

In some examples, the vehicle further includes an electronically controlled butterfly valve connected in-line with the monitor for controlling the flow of fluid to the monitor.

In some examples, the first wheel is a first drive sprocket of a first track assembly, and the first electric motor is constructed and arranged to drive a track of the first track assembly forward and/or backward via the first drive sprocket.

In some examples, the second wheel is a second drive sprocket of a second track assembly, and the second electric motor is constructed and arranged to drive a track of the second track assembly forward and/or backward via the second drive sprocket.

In some examples, each drive sprocket has an axle and the respective electric motor is oriented within the chassis such that a motor shaft of the motor forms a 90-degree angle with the axle of the drive sprocket. A respective gearbox, provided within the chassis, translates rotation of the motor shaft into corresponding rotation of the drive sprocket.

In some examples, the first electric motor and gearbox are mounted to a plate on a first side of the chassis, and the motor, gearbox, and plate are removeable as a unit through the first side of the chassis. Similarly, in some examples, the second electric motor and gearbox are mounted to a plate on a second side of the chassis, and the second motor, gearbox, and plate are removeable as a unit through the second side of the chassis. Such side access avoids having to open the chassis to service the motors.

In some examples, the vehicle includes a top deck attached to a top of the chassis. The top deck is substantially flat and provides a convenient surface for carrying equipment and/or personnel.

In some examples, the top deck or a portion thereof is removable, for example, in a manner that does not require tools.

In some examples, the floor of the chassis provides a first level at which components are housed, and the chassis further includes a second level disposed above the first level. The second level provides a convenient location for housing frequently serviceable items, such as relays, fuses, communication controllers, computer equipment, and the like, which may be used by the vehicle during its operation. Spare parts may also be stowed conveniently at the second level.

In some examples, the second level is accessed by removing the top deck, or a portion thereof, using a procedure that does not require tools. For example, the top deck or portion may be opened or removed using hand-operated clamps or latches.

In some examples, the second level is provided as a removeable component tray. The removeable component tray may be configured to disengage from the chassis without the use of tools, e.g., by opening hand-operated clamps or latches, disconnecting one or more electrical cables, and/or the like.

In some examples, the vehicle further includes a U-shaped or V-shaped mast assembly that extends upwardly from the top deck of the vehicle near a front of the top deck. The mast assembly may provide protection for the monitor in the unlikely event of a vehicle rollover.

In some examples, the mast assembly includes left and right forward-projecting scene lights, configured to illuminate an area in front of the vehicle. The left scene light points forward and to the left, and the right scene light points forward and to the right.

In some examples, the mast assembly includes a set of cameras. At least some of the set of cameras may be attached at a level higher than the monitor, e.g., so that the monitor does not block their field(s) of view. The set of cameras may include an optical camera and/or an infrared camera, which can be especially effective in smokey environments. In some examples, the set of cameras may further include a rear-facing camera, which points toward the rear of the vehicle, and thus can be useful when driving the vehicle in reverse.

In some examples, the mast assembly includes a set of antennas. Such antennas may include one or more wireless antennas (e.g., Wi-Fi, Bluetooth, cellular, or satellite, for example), and one or more video antennas, for transmitting video.

In some examples, the vehicle includes a liquid spray system for cooling an exterior of the vehicle. For example, a pipe or tube may be tapped from the conduit for receiving charged (i.e., pressurized) fluid. The fluid may be distributed, via a system of tubes and nozzles, to various regions of the vehicle where fluid-based cooling and/or fire suppression is desired. For example, nozzles may be provided above the left and right tracks, at the front corners of the vehicle, and/or above the vehicle (e.g., from one or more nozzles mounted to the mast assembly), where the fluid can be sprayed over the front of the vehicle itself and/or over an area directly in front of the vehicle and/or to the sides and/or all around the vehicle. The liquid spray system helps to keep vehicle surfaces, and especially the tracks, cool enough to resist deformation or degradation that might otherwise occur in hot environments in which active fires may be present.

In some examples, the vehicle further includes a winch assembly. The winch assembly is configured to run from electrical power of the vehicle. The electrical power may be provided by the set of battery modules (i.e., the same ones that drive the motor(s)) and/or may be provided from a separate set of batteries, such as one or more 12-volt batteries. In some examples, the winch assembly receives electrical power via an electrical outlet provided at or near the rear of the chassis.

In some examples, the vehicle further includes a towing receiver hitch coupled to the rear of the chassis. The receiver hitch has a hollow region for accepting a towing hitch of equipment to be towed. In some examples, the winch assembly is mounted to an external surface of the receiver hitch. The hollow region is thus left open and accessible, such that the receiver hitch can be used at the same time both for towing equipment and for supporting the winch assembly. Also, mounting the winch assembly to an external surface (e.g., the top) of the receiver hitch enables the winch assembly to be mounted closer to the chassis than it would be if attached to the end of the receiver hitch in the usual way, thus reducing turning moment and stress on components. In some examples, the winch assembly is coupled to the receiver hitch via a connecting pin and cotter pin, such that it is easily removeable from the vehicle.

In some examples, the vehicle further includes a modular, adjustable suspension carrier on each side of the vehicle.

In some examples, the conduit is one of multiple conduits arranged side-by-side and/or stacked vertically. One or more fluid couplings at the rear of the chassis allows for attachment of hoses or the like for delivering firefighting fluid from an environment outside of the vehicle, such as a firetruck or fire hydrant.

FIGS. 1-6 show various views of an example firefighting vehicle 100 in accordance with improvements hereof. As shown in FIG. 1, the firefighting vehicle 100 has a chassis 110 with first and second sides and modular suspension carriers 120a and 120b attached on first and second sides of the chassis 110, respectively. The chassis 110 is substantially cuboid in shape. First and second tracks 122a and 122b run in continuous loops around the first and second modular suspension carriers 120a and 120b. Each suspension carrier 120a or 120b includes a respective drive sprocket 124 and multiple other wheels (not labeled). Each drive sprocket 124 has an axle coupled to a respective electric motor inside the chassis 110. A top deck 130 forms a roof of the chassis 110 and provides a convenient location for carrying cargo and personnel. A mast assembly 140 extends up from the deck 130 and has various components attached thereto or integral therewith, such as a front-facing camera 142, various antennas 180 (e.g., Wi-Fi, Bluetooth, or other wireless communication antennas), and scene lights 190.

The firefighting vehicle 100 further includes a monitor 150, i.e., a controllable spraying nozzle, which may be aimed, for example, in both altitude (up-down) and azimuth (side to side). A butterfly valve 152, which may be electronically controlled, is placed in line with the monitor 150 for selectively turning on and off the flow of firefighting fluid. The firefighting vehicle 100 may further include a front bumper 160.

Fluid lines 170 provides firefighting fluid to multiple sprayers, e.g., sprayers 172, 174, and 176. The sprayers are placed at various locations of the firefighting vehicle 100 for spraying water or other firefighting fluid onto external surfaces and tracks of the vehicle and onto surroundings of the vehicle.

As shown in FIG. 2, the firefighting vehicle 100 may further include, at the rear of the chassis 110, a towing receiver hitch 210 and a winch assembly 220, which may be removeable. An electrical outlet 230 is connected to one or more batteries or power converters within the chassis 110 and provides electrical power to the winch assembly 220 and/or other equipment. A radiator 240 at the side of the chassis 110 (or on each side, or at the rear of the vehicle) provides cooling of certain components within the chassis 110 under certain scenarios, e.g., when the vehicle is operating in an environment that is not excessively hot.

As further shown in FIG. 2, the firefighting vehicle 100 includes an adapter 250, such as a fluid half-coupling, for receiving water or other pressurized fluid, e.g., from a hose connected to a fire hydrant or firetruck. The pressurized fluid is conveyed within the chassis 110 from the back of the chassis to the front of the chassis. There, the pressurized fluid is fed to the monitor 150, where it may be discharged in the direction of desired targets (fires). The firefighting vehicle 100 may further include a rear-facing camera 142a, such as an infrared camera, which may be provided on the mast assembly 140.

Figures 3, 4:
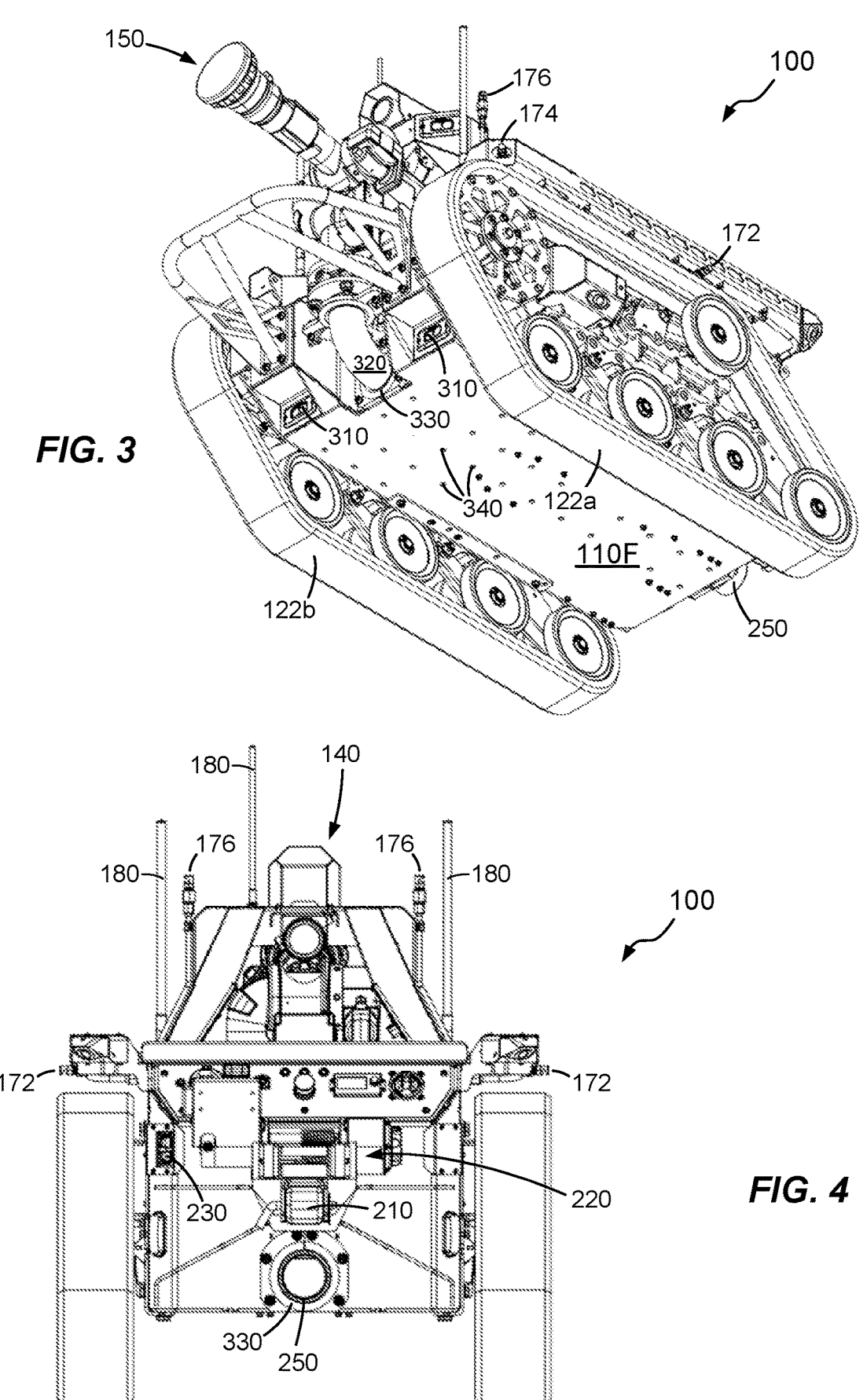
FIG. 3 is a front lower-left isometric view thereof.
FIG. 4 is an elevated rear view thereof.
Figure 5:
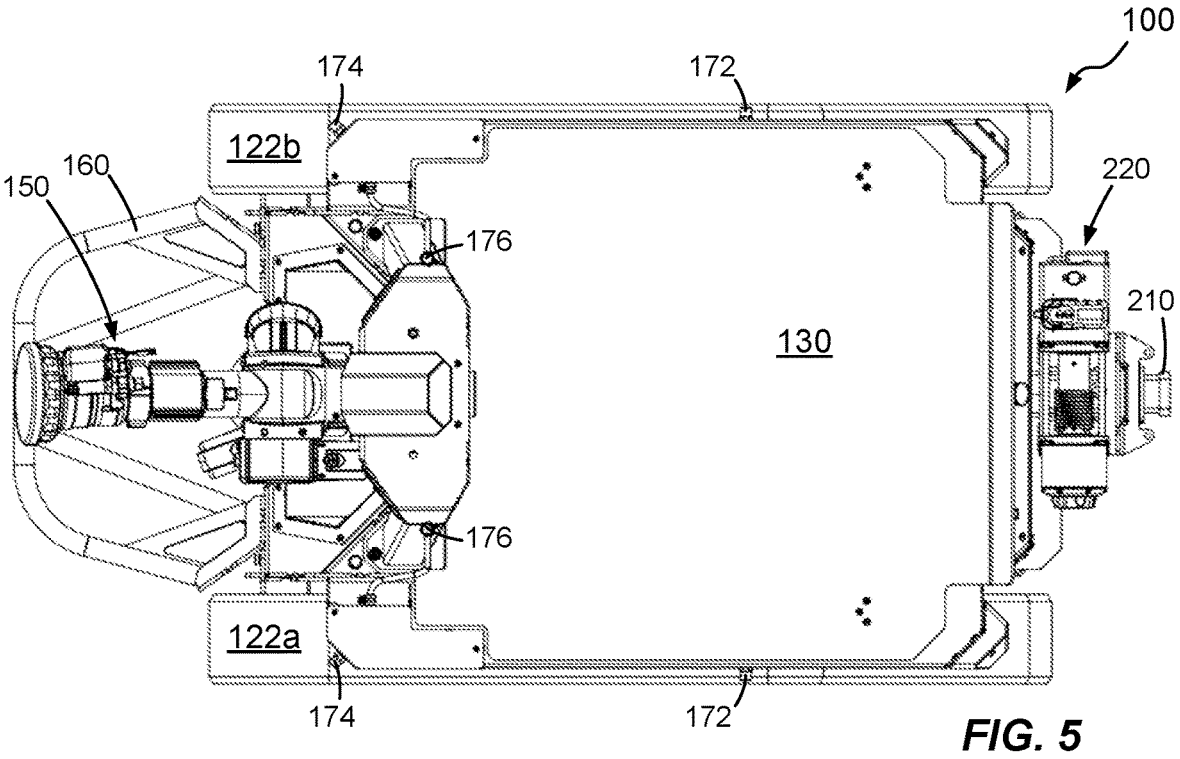
FIG. 5 is a top view thereof.
Figure 6:
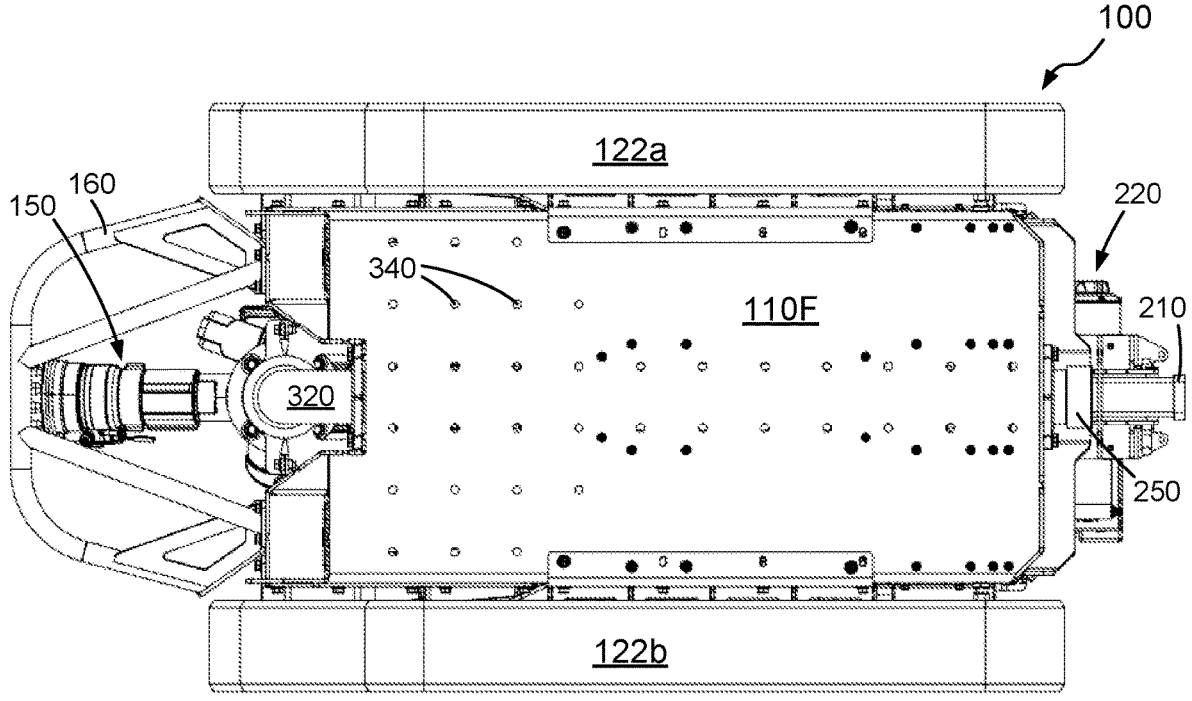
FIG. 6 is a bottom view thereof.

As shown in FIG. 3, the firefighting vehicle 100 may further include lower lamps 310 and front piping 320, which extends from a conduit inside the chassis 110 to the monitor 150. A flexible insert 330 provides suspension and cushioning between the piping and chassis 110, e.g., by preventing the transmission of vibration between the piping and the chassis 110. Also visible in FIG. 3 is a floor 110F of the chassis 110, which may include multiple perforations 340 for allowing drainage of any fluids that collect within the chassis 110. Additional views of the above-described features are provided in FIGS. 4-6.

Figure 7:
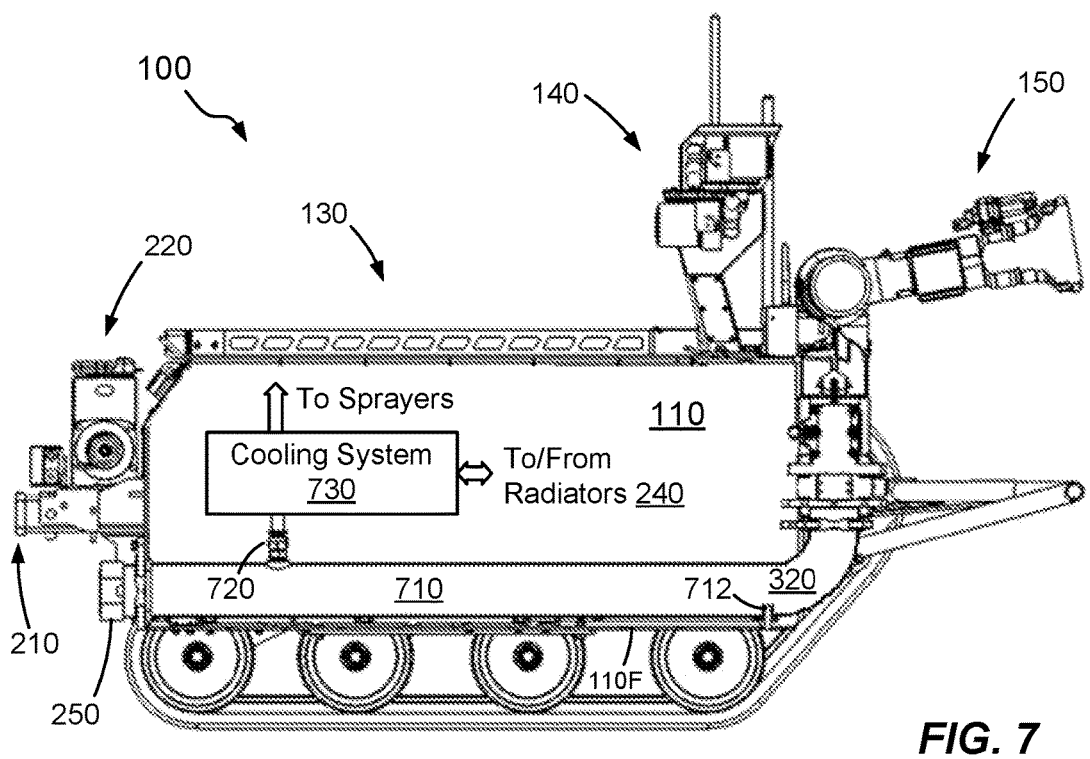
FIG. 7 is a partial sectional right-side view of the example firefighting vehicle of FIG. 1.

FIG. 7 is a partial sectional right-side view of the vehicle 100. Here, a conduit 710 extends along the floor 110F of the chassis 110 from the fluid half-coupling 250 at the rear of the chassis 110 to the piping 320 at the front of the chassis 110. One or more cradles 712 may support the conduit 710 within the chassis 110 and may provide cushioning and suspension. In an example, a fluid tap 720 connects to the conduit 710 for receiving a flow of pressurized fluid from the conduit 710. The tapped-off fluid travels to sprayers 172, 174, and 176 via fluid lines 170. In some examples, the tapped-off fluid is sent to the sprayers only after passing through a cooling system 730. In an example, the cooling system 730 uses tapped-off fluid to cool electrical components within the chassis 110, such as battery modules, electric motors, controllers, and power converters, for example. The sprayers thus serve a dual purpose—to cool external surfaces and surroundings of the vehicle and to eliminate waste heat generated by components within the chassis 110. The cooling system 730 may further exchange cooling fluid (e.g., antifreeze) with the radiator(s) 240, e.g., for cooling components of the vehicle during battery charging or otherwise when the vehicle is operating in an environment that is not excessively hot.

Figure 8:
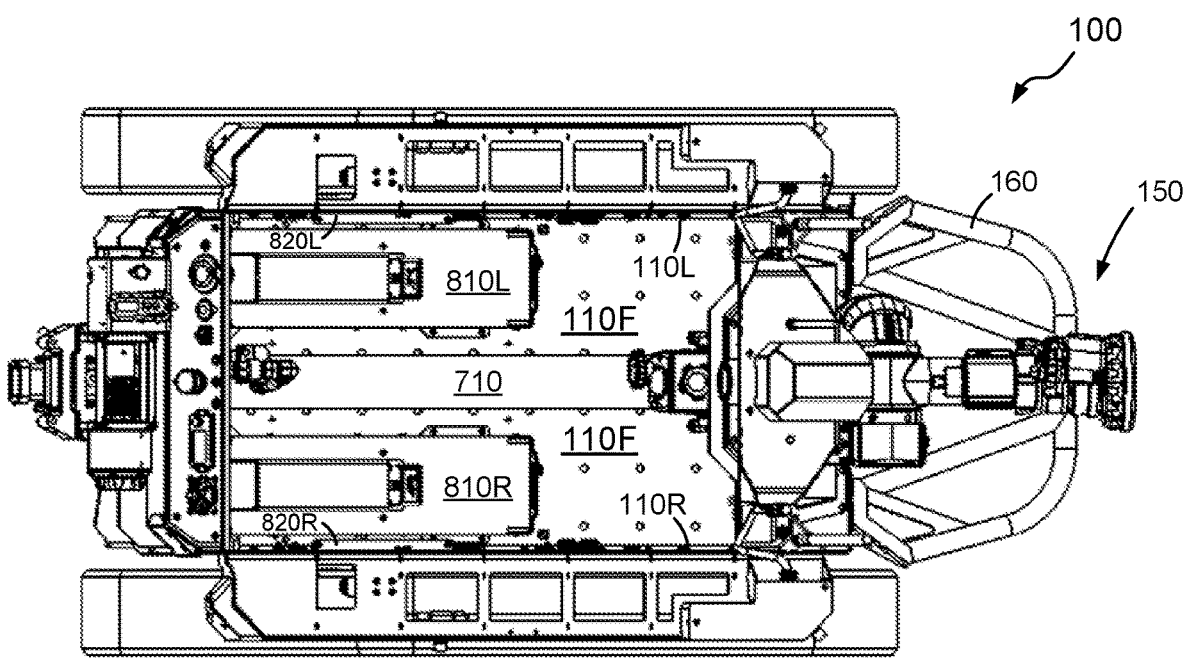
FIG. 8 is a top view of the example firefighting vehicle of FIG. 1, with certain components removed.

FIG. 8 shows a top view of the firefighting vehicle 100 with certain components removed. Here, the conduit 710 extends centrally along the floor 110F of the chassis 110, e.g., approximately equidistantly from the first and second (left and right) sides 110L and 110R of the chassis 110. Left and right battery modules 810L and 810R are mounted to the floor 110F of the chassis 110, one battery module on each side of the conduit 710. In an example, each of the battery modules 810L or 810R provides a DC (Direct Current) voltage, such as 96 volts. One should appreciate that the battery modules 810L and 810R have substantial weight and that mounting them to the floor 110F of the chassis 110 enhances stability of the firefighting vehicle 100 by lowering its center of gravity. Also, providing batteries as a pair of battery modules, one on each side of the conduit 710, balances the weight of the battery modules left-to-right, promoting symmetrical driving performance.

Also shown in FIG. 8 are left and right brackets 820L and 820R, which are mounted to the sides 110L and 110R of the chassis, respectively. As will be described, the brackets 820L and 820R provide mounting locations for a component tray.

Figure 9:
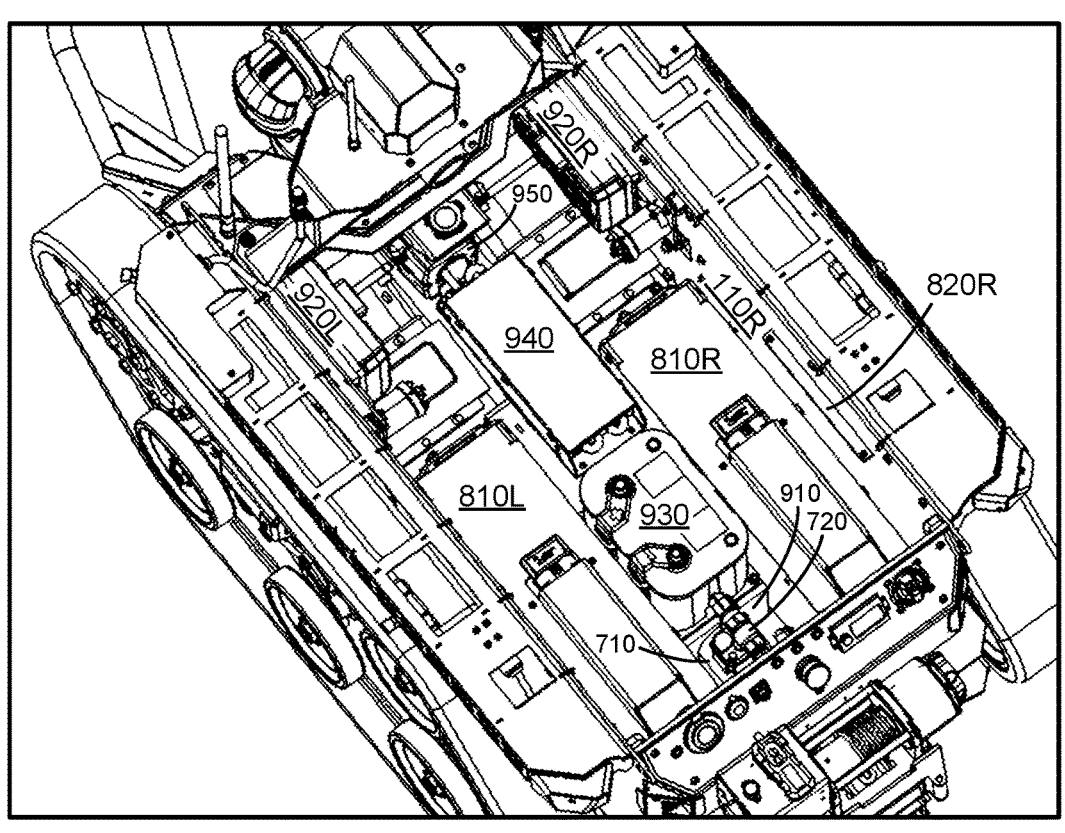
FIG. 9 is a rear, upper-left isometric view of the example firefighting vehicle of FIG. 1, with certain components removed.

FIG. 9 shows additional components that may be mounted within the chassis 110. Such components include first and second (left and right) electric motors 920L and 920R, which may be mounted to respective sides 110L and 110R of the chassis 110. The motors 920L and 920R may be provided as assemblies that include respective gear boxes. A cover/support 910, e.g., having an inverted-U shape with a flat top, covers the conduit 710 at least partway along the length of the chassis 110 and provides a base for mounting additional components, such as a low-voltage (e.g., 12 VDC) battery 930, power converters and associated cooling plates 940, and motor 950 for electronically controlling the butterfly valve 152. The power converters 940 may include DC/DC converters, as well as DC/AC converters, e.g., for supplying AC power to the outlet 230 (FIG. 2). One may observe that component placement within the chassis is substantially symmetrical, for providing balanced handling and driving behavior.

Figure 10:
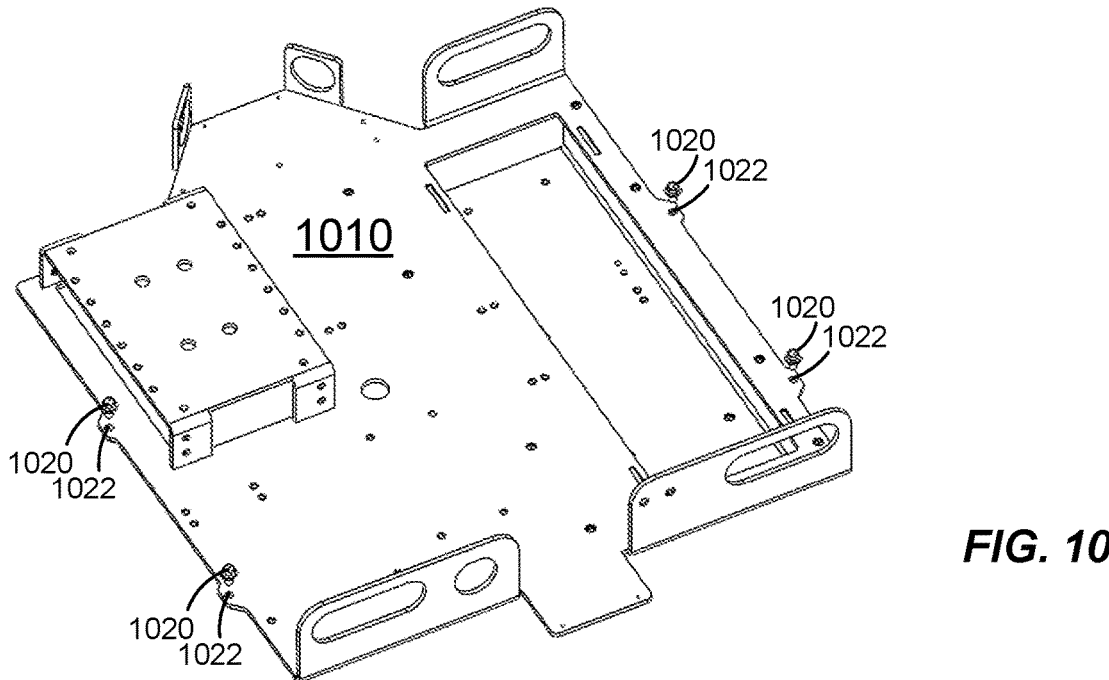
FIG. 10 is a rear, upper-left isometric view of an example component tray.

FIG. 10 shows an example component tray 1010, which may provide a second level for mounting equipment within the chassis 110. In an example, the tray 1010 stores frequently accessed and user-serviceable components, such as fuses, relays, computer equipment, and various replacement parts. The component tray 1010 fits within the chassis 110 and attaches to the chassis 110 above the battery modules and other components labeled in FIG. 9. For example, a pair of fasteners 1020 on each side of the component tray 1010 extend through holes 1022 and anchor into an aligned pair of holes in respective brackets 820L and 820R mounted to the first and second sides 110L and 110R of the chassis 110. In an example, the fasteners 1020 are hand-operable screws, bayonet mounts, or other components that may be fastened and unfastened by hand, i.e., without requiring the use of tools. In an example, the component tray 1010 may be accessed by removing at least a portion of the top deck 130 (FIG. 1).

Figure 11:
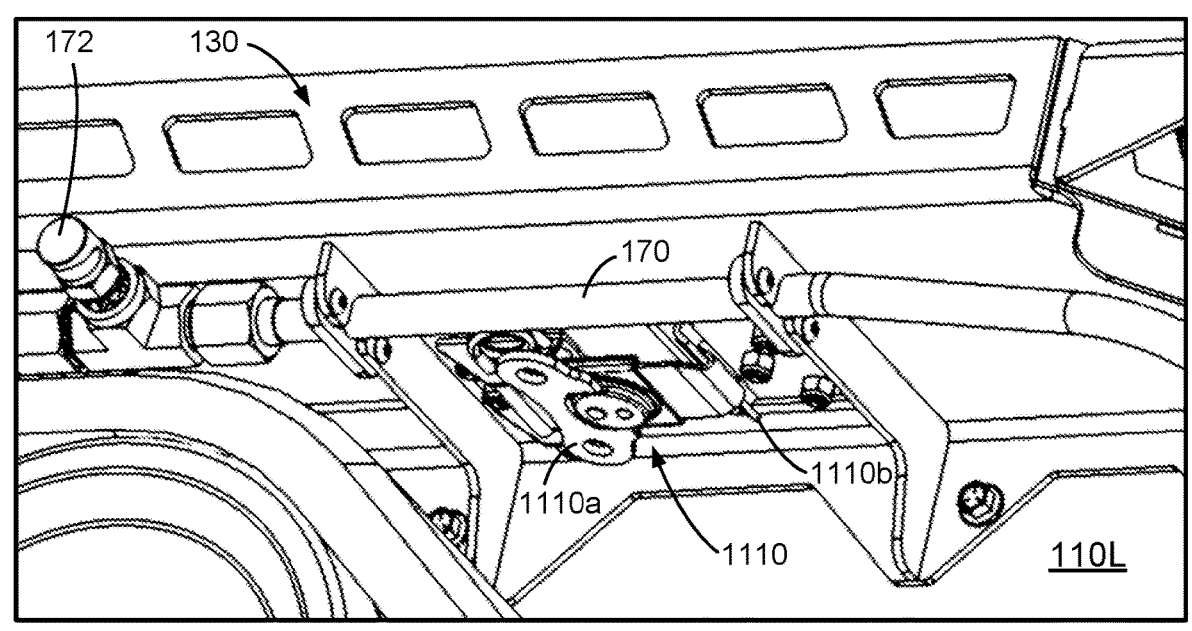
FIG. 11 is a lower-left isometric view of the underside of the top deck of FIG. 1.

FIG. 11 shows an example attachment of the top deck 130 of the firefighting vehicle 100 to the chassis 110. Here, a hand-operable latch 1110, e.g., a turn-to-open draw latch, can be used for attaching and releasing the top deck 130 or a portion thereof without tools. For example, the latch 1110 has a latching portion 1110a attached to the side of the chassis 110 and a capture portion 1110b attached to the top deck 130. By opening the latch 1110a on each side of the chassis (or multiple similar latches on each side), the deck 130 can be removed to provide direct access to the component tray 1010 beneath it.

Figure 12:
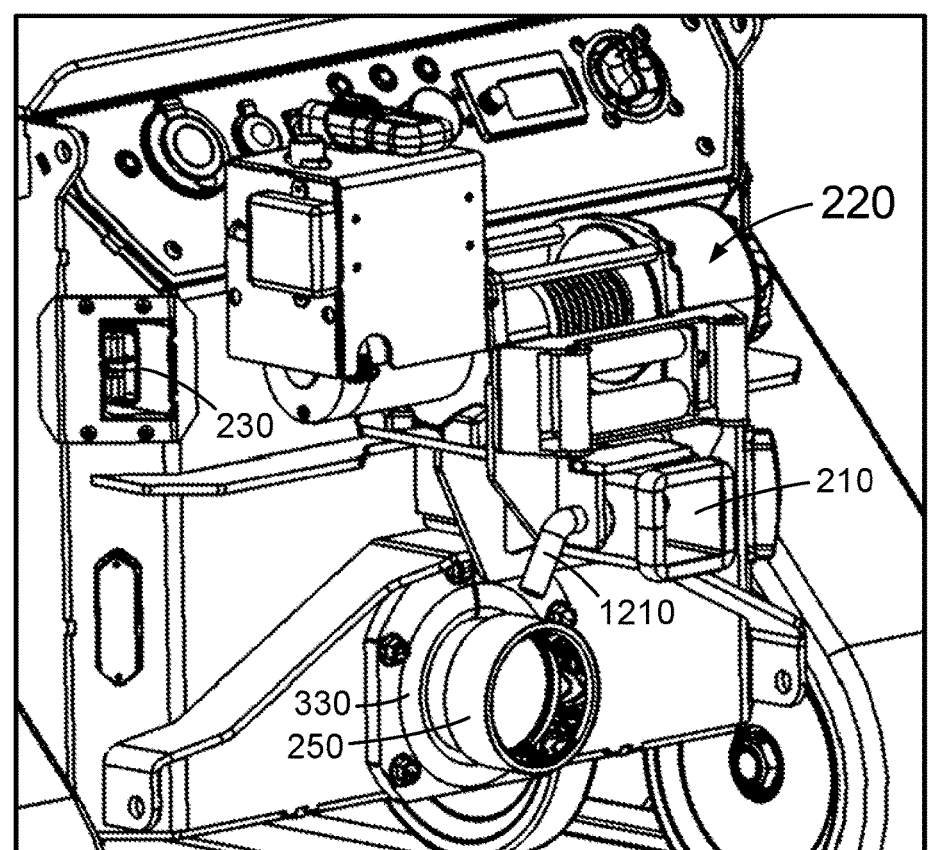
FIG. 12 is a rear-left isometric view of a portion of the rear of the firefighting vehicle of FIG. 1.

FIG. 12 shows the rear of the firefighting vehicle 100 in additional detail. Here, the winch assembly 220 attaches to the towing receiver hitch 210 using a pin 1210, which extends through the towing hitch 210. In an example, the pin 1210 is held in place using a cotter pin (not shown), which may attach to the pin 1210 on the far side of the receiver hitch 210.

Figures 13, 14:
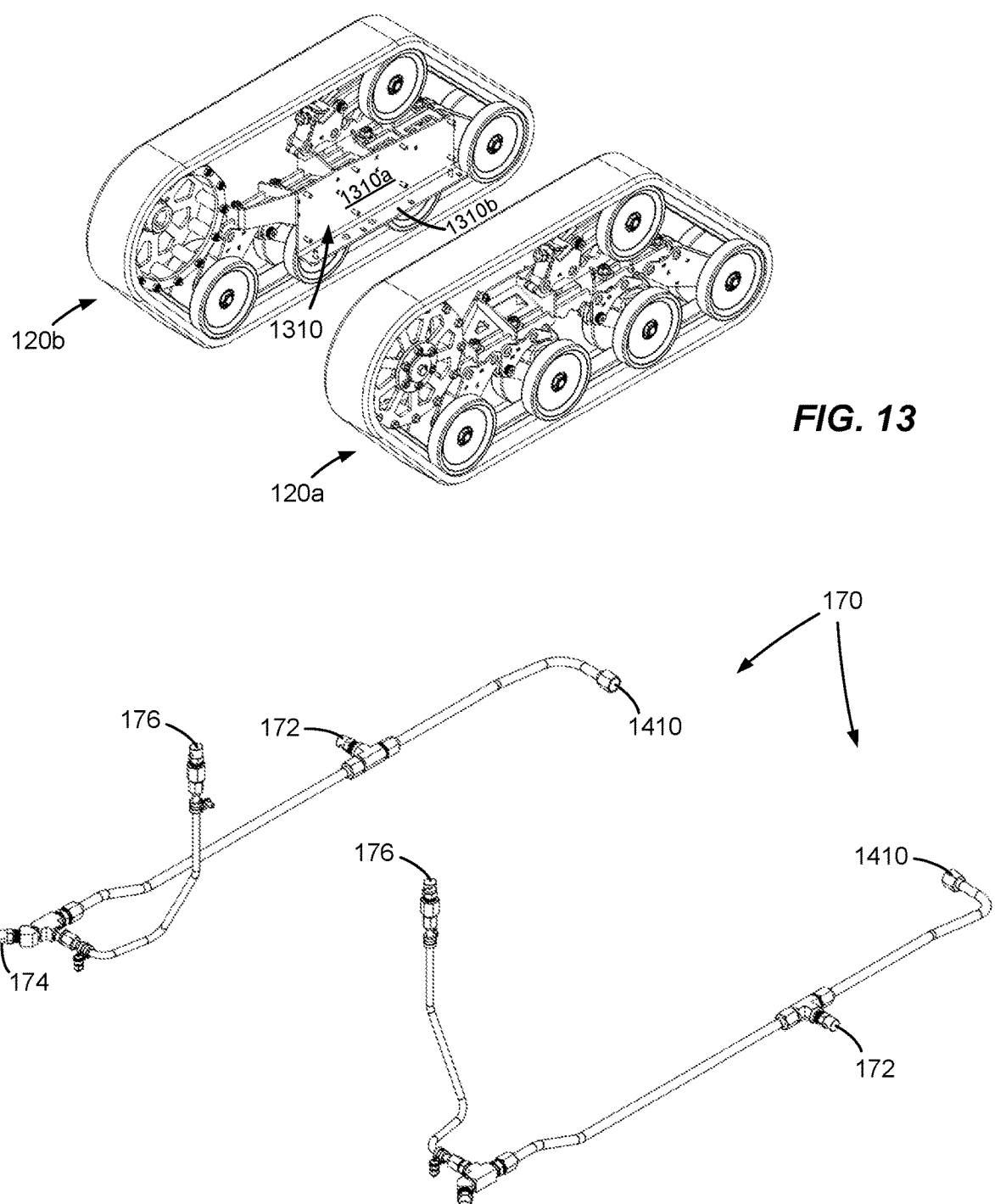
FIG. 13 is an upper-left isometric view of example modular suspension carriers of the firefighting vehicle of FIG. 1.
FIG. 14 is an upper-left isometric view of example fluid lines and sprayers.

FIG. 13 shows the modular suspension carriers 120a and 120b in additional detail. Each of the suspension carriers includes a bracket 1310 that may be bolted to the respective side of the chassis 110. In an example, each bracket 1310 is a right-angle bracket having a side portion 1310a for attaching to a respective side 110L or 110R of the chassis and a bottom portion 1310b for attaching to the floor 110F of the chassis.

FIG. 14 shows example fluid lines 170 and sprayers 172, 174, and 176 in additional detail. Here, sprayers 172, 174, and 176 are connected in a line, which starts at a half-coupling 1410 and extends first to a side sprayer 172, then to a corner sprayer 174, and finally to a top sprayer 176. Other arrangements are possible, however, including parallel connections between half-couplings and sprayers. Each half-coupling 1410 connects to the fluid tap 720, e.g., via the cooling system 730. For example, the cooling system 730 may include a heat exchanger (not shown), and the half-couplings 1410 may connect to the heat exchanger to receive fluid that has already absorbed heat from the heat exchanger.

Additional Information

The disclosed electric firefighting robot 100 is a multifunctional firefighting vehicle that enhances and diversifies the resources available to a firefighter. The disclosed technique serves at least two main purposes, 1) to direct water or other firefighting fluid from a charged hose via a remote operated nozzle (monitor 150), and 2) provide a modular platform for outfitting gear, attachments, tools, and other relevant firefighting items. The remote operated nozzle 150 allows the operator to fight a fire from a safe distance, as well as to allow a greater water volume than a conventional hand line. The flat deck 130 on top of the robot 100 provides an area for additional payloads to be stored. Several other features on the robot provide additional tooling in the form of a towing receiver hitch 210, a winch 220, scene lighting 190, and cameras 142 and 142a for situational awareness.

A chassis hull 110 contains a fully electric drivetrain and battery bank for powering the vehicle 100. The hull may be composed of steel or other materials, such as other metals and composite materials. Bolted to the chassis hull 110 is a track suspension system 120a and 120b complete with drive sprockets 114, as well as road wheels and a tensioner wheel. The hull 110 is covered by a flat deck panel 130 that is removeable without tools for providing access to the inside of the chassis 110. The flat deck panel 130 protects the inner components of the chassis 110 and provides a surface for additional payloads to be mounted or stored.

A mechanically isolated water passageway 710 delivers water through the vehicle 100, starting from the rear of the robot where a charged hose is attached, and ending at a remotely operated water nozzle 150. The water can be stopped or started at the nozzle by operating an electric butterfly valve 152, allowing for charged water to be available immediately. Mechanical isolation 330 of the water passageway is good design practice for a pressure vessel such as this, where hard mounts would create stress concentrations that would fatigue the vessel and chassis. These stress concentrations would be brought about by physical forces applied to the vessel (pulling the charged hose) as well as temperature fluctuations that expand and contract materials at different rates. Mechanical isolation 330 could be provided in the form of passive materials, e.g., rubberized or elastomeric couplings that reduce the transmission of vibration, or active isolation, e.g., sensors and actuators that reduce vibration in a manner analogous to noise cancellation.

A towing receiver hitch 210 located on the rear of the vehicle 100 accepts a hitch for moving trailers. A removeable winch 220 pins to the outside of this receiver hitch 210, allowing for toolless removal of the winch as well as use of the receiver hitch while the winch is installed. The winch 220 plugs into a port 230 in the back of the vehicle 100 for power supply.

An elevated platform 140 on top of the flat deck 130 behind the water nozzle 150 serves several purposes, including a mount for antennas 180, visual cameras 142, infrared cameras 142a, scene lights 190, and vehicle cooling sprayers 176. The platform 140 is also a safety feature in the event of a rollover, decreasing the risk of damaging the robot 100, water nozzle 150, and personnel.

Water lines 170 fed by inlet 1410 of the water passageway run along the edges of the robot 100, expelling water from nozzles 172, 174, and 176 which keep the robot and suspension system cool. These lines 170 continue up to the elevated platform 140 to mist the vicinity of the robot for cooling in hot environments, allowing the robot to be as close to the flames as possible.

Having described certain embodiments, numerous alternative embodiments or variations can be made. For example, although embodiments have been described in connection with tracked, robotic vehicles, other embodiments may be realized that do not use tracks and/or do not require robotic operation.

Further, although embodiments have been described that involve both left and right battery modules 810L and 810R, additional battery modules may be provided, based on power demands on the vehicle and other factors. There is no necessary correspondence between battery modules and electric motors 920L and 920R. For example, battery modules may be connected in parallel, connected in series, or grouped in any suitable way. A battery module on the left can connect to a motor on the right, and vice-versa.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the disclosure.

Table of Reference Numerals

| Reference Numeral | Description |
| --- | --- |
| 100 | Robotic firefighting vehicle |
| 110 | Chassis |
| 110F | Floor of chassis |
| 110L | Left side of chassis |
| 110R | Right side of chassis |
| 120a | Left modular suspension carrier, attached to left side of chassis |
| 120b | Right modular suspension carrier, attached to right side of chassis |
| 122a | Left track |
| 122b | Right track |
| 124 | Drive sprocket, driving by an electric motor via gearbox |
| 130 | Top deck (e.g., flat, for transporting equipment and/or personnel); may be removeable in whole or in part without tools. |
| 140 | U-shaped or V-shaped mast (e.g., for carrying camera(s), antennas, and/or fluid sprayers). |
| 142 | Front-facing camera |
| 142a | Rear-facing camera |
| 150 | Monitor (controllable for left-right, up-down pointing), e.g., via remote belly back |
| 152 | Butterfly valve (for controlling flow of fluid through monitor); e.g., remotely controllable. |
| 160 | Bumper |
| 170 | Fluid lines, supplying fluid to sprayers 172, 174, and 176 |
| 172 | Side sprayer |
| 174 | Corner sprayer |
| 176 | Top sprayer |
| 180 | Antennas |
| 190 | Scene lights |
| 210 | Towing hitch receiver |
| 220 | Winch assembly |
| 230 | Electrical outlet, e.g., for winch assembly |
| 240 | External radiator |
| 250 | Adapter, such as half coupling for receiving charged fluid (e.g., water, gel, and/or foam), e.g., via hose from fire hydrant, fire truck or other fluid source |
| 310 | Lower lamps |
| 320 | Front piping to monitor |
| 330 | Suspension coupling (active or passive), such as a flexible insert (provides suspension/cushioning between piping and chassis |
| 340 | Perforations in the floor of the chassis, e.g., for allowing drainage. |
| 710 | Main conduit (e.g., pipe) running from half coupling 250 to front piping 320 along bottom of chassis. |
| 712 | Cradles, for supporting conduit within chassis. |
| 720 | Fluid tap from main conduit; supplies fluid to sprayers and optionally provides fluid for other cooling purposes. |
| 730 | Cooling system |
| 810L/R | Left and right battery modules (e.g., 96 VDC) for supplying power to left and right motors, respectively. |
| 820R/L | Right/Left brackets for attaching second level/tray |

12

-continued

Table of Reference Numerals

| Reference Numeral | Description |
| --- | --- |
| 910 | Conduit cover/bridge, e.g., for covering conduit and providing support for equipment attached above conduit |
| 920L/R | Left and right motors, for turning left and right drive wheels (e.g., sprockets), respectively; purple components are motor controllers, which may be chilled. |
| 930 | Low-voltage (e.g., 12 VDC) battery |
| 940 | Power converters and associated cold plate for cooling |
| 950 | Drive motor for controlling butterfly valve |
| 1010 | Component tray providing second level; preferably removable from chassis without the use of tools; houses components for which convenient access is desired, such as fuses, relays, controllers, communication components, spare parts, etc.; disposed above batteries and may be parallel to floor. |
| 1020 | Fasteners, for attaching tray 1010 to chassis 110 |
| 1022 | Holes, for receiving fasteners 1020 |
| 1110 | Hand-operable latch, e.g., turn-to-open draw latch, for releasing top deck or portion thereof without tools. |
| 1110a | Latching portion of latch 1110 attached to the side of the chassis 110 |
| 1110b | Capture portion of latch 1110 attached to the top deck 130 |
| 1210 | Connecting pin; e.g., used to attach winch assembly 220 to towing hitch receiver 210; may be held in place by cotter pin (not shown) on far side; removeable as a unit. |
| 1310 | Bracket for mounting modular suspension carrier to chassis 110; right bracket shown; left bracket is mirror image, for example. |
| 1310a | Side portion of bracket 1310 |
| 1310b | Floor portion of bracket 1310 |
| 1410 | Half couplings; e.g., plumbed to fluid tap 720 |

What is claimed is:

1. A firefighting vehicle, comprising:
a chassis having a back and a front;
a conduit within the chassis for conveying firefighting fluid from the back to the front;
first and second electric motors within the chassis at first and second sides of the conduit, respectively, the first and second electric motors respectively configured to drive first and second wheels for propelling the firefighting vehicle; and
first and second battery modules within the chassis at the first and second sides of the conduit, respectively, each of the first and second battery modules coupled to at least one of the first and second electric motors for providing power thereto,
wherein the chassis further has a first side and second side, wherein the firefighting vehicle further comprises a component tray mounted above the battery modules and above the conduit inside the chassis, the component tray attached to respective brackets mounted to the first side and the second side of the chassis, and wherein the component tray houses components for which convenient access is desired, said components including any of: fuses; relays; and spare parts.

2. The firefighting vehicle of claim 1, wherein the firefighting vehicle is a tracked vehicle having first and second tracks driven around first and second removeable suspension carriers, respectively, and wherein the first and second wheels include first and second drive sprockets that engage the first and second tracks.

3. The firefighting vehicle of claim 2, wherein the first electric motor is mounted to the first side of the chassis, and wherein the second electric motor is mounted to the second side of the chassis.

4. The firefighting vehicle of claim 1, wherein the chassis has a floor, and wherein the first and second battery modules are mounted to the floor of the chassis.

5. The firefighting vehicle of claim 4, wherein the floor of the chassis has perforations to allow drainage.

6. The firefighting vehicle of claim 4, wherein the conduit runs centrally along the floor of the chassis between an adapter at the rear of the chassis and a monitor at the front of the firefighting vehicle.

7. The firefighting vehicle of claim 6, further comprising a passive or active suspension coupling disposed between the conduit and the chassis to reduce transmission of vibration between the conduit and the chassis.

8. The firefighting vehicle of claim 6, further comprising additional equipment and a cover mounted above the conduit inside the chassis, the cover providing a support for mounting the additional equipment within the chassis.

9. The firefighting vehicle of claim 8, wherein the additional equipment mounted to the support includes a low-voltage battery and a cold plate for cooling power converters.

10. The firefighting vehicle of claim 6, further comprising:

a fluid tap coupled to the conduit, the fluid tap constructed and arranged to draw fluid from the conduit; and a set of sprayers coupled to the fluid tap, the set of sprayers constructed and arranged to spray at least a portion of the fluid drawn from the conduit onto external surfaces and tracks of the firefighting vehicle.

11. The firefighting vehicle of claim 10, further comprising a cooling system coupled in line between the fluid tap and the set of sprayers, the cooling system constructed and arranged to provide the fluid drawn from the conduit for cooling electrical components within the chassis.

12. The firefighting vehicle of claim 1, wherein the component tray is attached to the respective brackets using hand-operable fasteners.

13. The firefighting vehicle of claim 1, wherein the component tray is user-accessible via a top deck of the firefighting vehicle, the top deck attached to the firefighting vehicle using hand-operable fasteners and being removeable from the firefighting vehicle for providing access to the component tray by disengaging the hand-operable fasteners without the use of tools.

14. A chassis for a firefighting vehicle, comprising:

a conduit for conveying firefighting fluid from a back of the chassis to a front of the chassis;

first and second electric motors disposed at first and second sides of the conduit, respectively, the first and second electric motors constructed and arranged to drive first and second respective wheels for propelling the firefighting vehicle; and first and second battery modules disposed at the first and second sides of the conduit, respectively, each of the first and second battery modules coupled to at least one of the first and second electric motors for providing power thereto, wherein the chassis further has a first side and second side, wherein the firefighting vehicle further comprises a component tray mounted above the battery modules and above the conduit inside the chassis, the component tray attached to respective brackets mounted to the first side and the second side of the chassis, and wherein the component tray is user-accessible via a top deck of the firefighting vehicle, the top deck attached to the firefighting vehicle using hand-operable fasteners and being removeable from the firefighting vehicle for providing access to the component tray by disengaging the hand-operable fasteners without the use of tools.

15. The chassis of claim 14, wherein the first electric motor is mounted to a first side of the chassis and the second electric motor is mounted to a second side of the chassis.

16. The chassis of claim 14, wherein the first and second battery modules are mounted to a floor of the chassis, and wherein the conduit runs centrally along the floor of the chassis between an adapter at the rear of the chassis and the front of the chassis.

17. The chassis of claim 16, wherein the component tray is removeable from the chassis by disengaging one or more hand-operable fasteners.

18. A firefighting vehicle, comprising:

a chassis having a back and a front;

a conduit within the chassis for conveying firefighting fluid from the back to the front;

first and second electric motors within the chassis at first and second sides of the conduit, respectively, the first and second electric motors respectively configured to drive first and second wheels for propelling the firefighting vehicle;

first and second battery modules within the chassis at the first and second sides of the conduit, respectively, each of the first and second battery modules coupled to at least one of the first and second electric motors for providing power thereto;

a fluid tap coupled to the conduit, the fluid tap constructed and arranged to draw fluid from the conduit;

a set of sprayers coupled to the fluid tap, the set of sprayers constructed and arranged to spray at least a portion of the fluid drawn from the conduit onto external surfaces and tracks of the firefighting vehicle; and a cooling system coupled in line between the fluid tap and the set of sprayers, the cooling system constructed and arranged to provide the fluid drawn from the conduit for cooling electrical components within the chassis.

19. The firefighting vehicle of claim 18, wherein the chassis has a floor, and wherein the first and second battery modules are mounted to the floor of the chassis.

20. The firefighting vehicle of claim 18, wherein the conduit runs centrally along the floor of the chassis between an adapter at the rear of the chassis and a monitor at the front of the firefighting vehicle.

\* \* \* \* \*